United States Patent Office 3,365,417
Patented Jan. 23, 1968

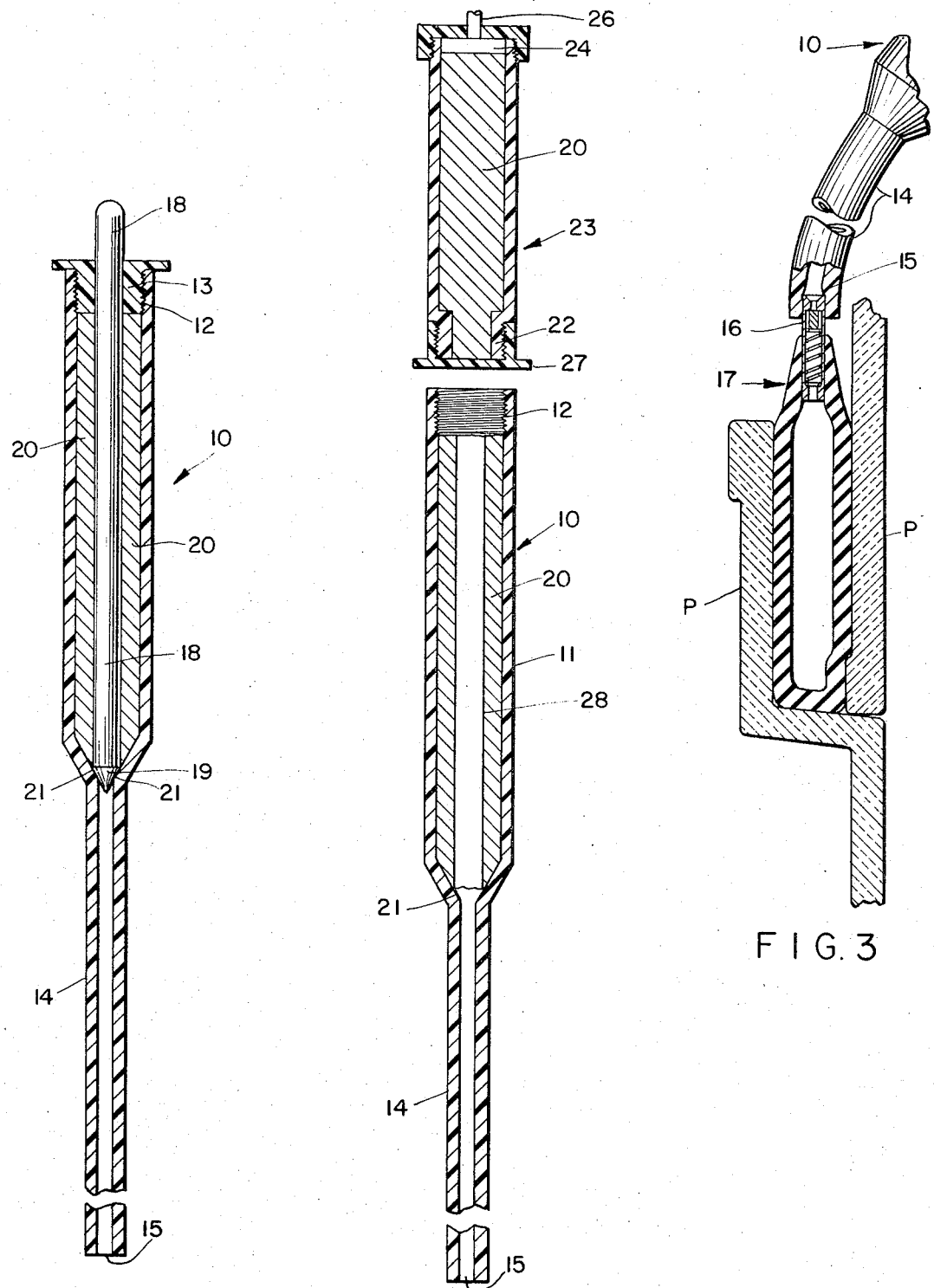

3,365,417
METHOD AND APPARATUS FOR MIXING
CATALYST WITH RESIN
Francis P. Gavin, Waltham, and Richard C. Gendron, Cambridge, Mass., assignors to W. R. Grace & Co., Cambridge, Mass., a corporation of Connecticut
Filed Mar. 11, 1965, Ser. No. 438,970
5 Claims. (Cl. 260—34.2)

This invention is concerned with the method and equipment filling inflatable seals with resins which harden in situ.

One of the difficulties attendant to the use of inflatable seals such as are used for sealing the bell and spigot joints or sewer lines and in other locations where inflatable gaskets are required, has been that the most useful resins must be mixed with a catalyst immediately prior to forcing the resin into the hollow gasket. In the hands of a plumber, unused to any of a chemist's techniques, the mixing procedures have gone awry. Defective seals have been produced, either because the amount of activator was deficient, improperly mixed, or not used at all.

The present invention successfully overcomes this difficulty. It hase been discovered that if the catalyst or activator be dissolved or dispersed in a substance which will solidify or form a semi-solid and release the catalyst when contacted by the resin or which itself is preferably soluble in the resin, and if the full charge of resin is forced through a passage formed in the solidified mass, a uniform distribution of the catalyst will result, for the material which suspends the catalyst dissolves or releases the catalyst as the resin is forced through it carrying increments of catalyst into the resin. Consequently, as the resin enters the hollow space within the gasket, it is thoroughly and uniformly mixed with the catalyst.

The apparatus which secures this result is shown in the figures, wherein FIG. 1 is a side view of the apparatus, FIG. 2 shows in elevation, the syringe-cartridge in position of use, FIG. 3 shows the cartridge attached to an inflatable gasket in a bell and spigot joint (shown in partial vertical section).

As supplied to the trade, the apparatus consists of two parts: (1) a disposable syringe which holds below its piston the proper amount of a liquid resin to fill the gasket cavity, and (2) a cartridge which holds the activator.

The cartridge 10 comprises a hollow cylindrical chamber 11, preferably made of an inert and inexpensive material such as polyethylene. The interior wall 12 of the chamber 11 is threaded at the upper end to receive a sealing plug 13. The lower end of the cartridge 10 terminates in a tube 14, the opening 15 of which is adapted to fit over the filling tube 16 of an inflatable gasket 17 (see FIG. 3).

A removable rod 18 (or a tube having both ends sealed) has its lower end 19 formed in a conical shape. This, by its mating engagement with the inclined wall 21 of the cartridge 10, forms a seal which prevents the activator material from flowing downwardly into the tube 14.

After the rod 18 has been pushed into position, the cartridge is loaded with a mixture of naphthalene and an organic peroxide 20. The sealing plug 13 is pushed over the rod 18 and secured into the threaded wall portion 12.

ACTIVATOR MIXTURE

Various media to hold the peroxide catalyst in suspension within the cartridge can be used. For example, the peroxide can be gelled by the addition of colloidal silica, or it can be incorporated in a weak gel formed of dioctyl phthalate and a minor proportion of polyvinyl chloride. But we prefer to use naphthalene, since this has been found to provide long shelf life of the peroxide component. A mixture comprising 60 parts of naphthalene and 40 parts of a commercial peroxide catalyst (Lupersol DMD, methyl ethyl ketone peroxide) can be melted, since combination of these ingredients in the proportions given apparently produces a eutectic which melts at apparoximately 60° C. With the sealing rod 18 in place within the cartridge, the molten mixture is poured into the space and allowed to solidify about the walls of the rod to form a semi-solid mass.

When the cartridge is about to be used, the sealing plug 13 is removed together with the rod 18 and these parts are discarded. The threaded end of the cartridge is then screwed onto a mating extension 22 of the syringe 23. The orifice of tube 14 is fitted over the filling tube 16 of the inflatable gasket 17 and the plunger of the syringe is pushed, forcing out the charge of resin which is packaged in the syringe 23 below the piston 24. As the resin flows through the bore in the naphthalene-activator material which is left when the rod is pulled out of the cartridge 10 it progressively dissolves the napththalene-activator composition from the walls of the bore. A definite distance of resin travel along the bore is necessary to insure that each increment of resin picks up a sufficiency of activating material. It has been found that when the axial bore provided for the passage is initially 4 mm. in diameter, and the charges of resin lie between 30 and 100 grams, at least 50 mm. of transit distance should be provided.

Accordingly, if a 4-inch soil pipe is to be gasketed, the amount of resin sufficient to fill such a gasket should travel down a bore length of approximately 50 mm. and in its passage through the cartridge will dissolve and pick up at least 3 and generally from 3 to 6 grams of the naphthalene-peroxide mixture.

The syringe 23 which is of conventional construction formed of an inexpensive inert material such as polyethylene, has a volumetric capacity sufficient fully to fill the void space within the gasket. After filling the syringe 23 with resin, a disposable cap 27 is screwed on to the extension 22 of the syringe 23. The threads on extension 22 mate with the internal threads in the inportion 12 of the cartridge 10.

The arrangement of the separate parts is such that the syringe cannot be fitted on to the filler tube 16 of a gasket 17, nor will the wrong end of the cartridge 10 fit on tube 16. Accordingly, the combination is effectively foolproof. When the two elements are fitted together, pressure on the piston 24, exerted through the rod 26, forces the resin 20 along the bore 28 of the cartridge 10. As the resin progresses along this passage, it erodes the walls, picks up and mixes with the catalyst, and consequently a properly catalyzed resinous mass emerges from the tube 14.

The resins which are suitable for this invention are any of the types generally known as unsaturated polyester resins which cross-link following contact with organic peroxides, especially in the presence of unsaturated monomers such as styrene. Similarly, any organic peroxide used for cross-linking unsaturated polyester resins can be employed including those which are normally solid but in a finely divided form. However, it is preferred to employ the normally liquid organic peroxides since more effective results are obtained. It is obvious that although the above combination has been designed specifically for inflatable gasket loading, it can find utility in other areas such as in the encapsulation of electronic components and many areas of assemblies of this nature which require the protection of a surrounding resinous mass.

EXAMPLE I

A cartridge having a bore diameter of 1.4 cm. and a bore length of 10 cm. was fitted with a rod, ½-cm. in diameter. The catalyst charge, naphthalene 60 parts, methyl ethyl ketone peroxide (Lupersol DDM, Wallace and Tierran Co.) 40 parts, was loaded into the free space around the rod. A polyester resin containing about 25 percent of styrene (Plaskon 9405, Allied Chemical Company) to which was added and mixed 0.36 percent by weight based on the total resin mixture weight of cobalt octoate promoter was charged into the syringe package. The end of the tube 14 was fitted over the fill-tube of a ring gasket inserted in the bell and spigot joints between the cast iron pipes as shown at PP, FIG. 3. Pressure was exerted on the piston rod to drive the resin into the gasket under pressures of from 70–80 pounds. After 24 hours the pipe joint was disassembled and its rubber gasket was cut away from the resin core. There were no voids. All areas were uniformly cured. The weight of the injected polyester was 48 grams.

The system provides inexpensive packaging and a foolproof method of loading an inflatable gasket with properly activated liquid resin. Mixing the resin properly with the activator is complete, for not only do proper increments of activator pass into the resin as it is forced through the bore 28 in the activator material, but its passage through the tubular extension 14 secures additional mixing. Obviously, other means of enhancing mixing can be employed such as baffles within the cartridge or circuitous and multiple passages for the resin through the activator mixture.

The method of assembly and use is so simple that bad seals are not produced, and the whole operation of gasketing soil pipes can be completed in just a few moments.

The term "solidifying agent" used in the claims is intended to mean a substance capable of gelling, absorbing, or holding in uniform distribution the amount of organic peroxide necessary to cause the cross-linking of the liquid resin forced through the catalyst mass and capable of releasing the organic peroxide when contacted by the resin.

We claim:

1. A device for injecting catalyzed resin into a receptacle wherein the resin is to harden, comprising the combination of (a) a syringe filled with a liquid uncatalyzed polyester resin, the said syringe having an exit orifice and attachment means surrounding said orifice, and (b) a tubular cartridge containing an organic peroxide catalyst for the said resin and a solidifying agent, a delivery tube at one end of the cartridge, means provided at the opposite end of said cartridge to connect the same to the attachment means of said syringe, and means to form a passage through the said catalyst mass whereby, when the said syringe and the said cartridge are joined, resin may be forced through the said passage and entrain catalyst during the passage of the liquid resin from said syringe to the said delivery tube.

2. A device according to claim 1 wherein the means to form a passage through the catalyst mass comprises a removable rod seated against the upper end of said delivery tube and extending lengthwise through the said catalyst mass to form thereby a passage through said mass when the rod is removed.

3. A device according to claim 1 wherein the catalyst mass comprises a carrier having an organic peroxide uniformly distributed therein, and wherein the carrier is soluble in the liquid polyester.

4. A device according to claims 1 and 3 wherein the carrier is naphthalene, and the organic peroxide is methyl ethyl ketone peroxide.

5. The process of mixing a polymerization catalyst with a liquid resin which includes, uniformly distributing the catalyst in a suspending medium and allowing the suspension to solidify, then prior to placing the resin in its final position, forcing the liquid resin through a passage formed in the catalyst mass, whereby the flow of resin through said passage will remove catalyst material from said catalyst mass and produce a uniformly catalyzed resin-catalyst mixture.

References Cited

UNITED STATES PATENTS

| | | | |
|---|---|---|---|
| 2,841,145 | 7/1958 | Epps | 222—386 |
| 3,028,052 | 4/1962 | Archer | 222—386 |
| 3,144,966 | 8/1964 | Cook | 222—386 |
| 489,396 | 1/1893 | Stott | 239—316 |

ALEXANDER H. BRODMERKEL, *Primary Examiner.*

A. KOECKERT, *Examiner.*